US012235626B2

(12) United States Patent
Yoo et al.

(10) Patent No.: US 12,235,626 B2
(45) Date of Patent: Feb. 25, 2025

(54) METHOD FOR DETERMINING MOVEMENT OF ELECTRONIC DEVICE AND ELECTRONIC DEVICE USING SAME

(71) Applicant: Samsung Electronics Co., Ltd., Suwon-si (KR)

(72) Inventors: Jinseon Yoo, Suwon-si (KR); Harkjoon Kim, Suwon-si (KR); Heeyoung Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 552 days.

(21) Appl. No.: 17/131,198

(22) Filed: Dec. 22, 2020

(65) Prior Publication Data

US 2021/0200189 A1    Jul. 1, 2021

(30) Foreign Application Priority Data

Dec. 31, 2019   (KR) .................. 10-2019-0179037

(51) Int. Cl.
*G06Q 30/02*        (2023.01)
*G05B 19/4155*      (2006.01)
(Continued)

(52) U.S. Cl.
CPC ....... *G05B 19/418* (2013.01); *G05B 19/4155* (2013.01); *G05D 1/0212* (2013.01);
(Continued)

(58) Field of Classification Search
CPC .............. G05B 19/418; G05B 19/4155; G05B 2219/31001; G05B 2219/50391;
(Continued)

(56) References Cited

U.S. PATENT DOCUMENTS 8,725,567 B2 * 5/2014 Huang ............... G06Q 30/0269
                                                    705/14.49
9,049,348 B1 * 6/2015 Foster .................... H04N 7/183
(Continued)

FOREIGN PATENT DOCUMENTS

CN          109978813 A  *  5/2018
JP          2007-152442 A    6/2007
(Continued)

OTHER PUBLICATIONS

International Search Report and Written Opinion of the International Searching Authority in connection with International Application No. PCT/KR2020/017790 issued Mar. 5, 2021, 10 pages.
(Continued)

*Primary Examiner* — Thuy N Nguyen

(57) ABSTRACT

An electronic device is disclosed. According to an embodiment of this disclosure, an electronic device may include a communication circuit receiving data from at least one external device or to transmit data to the at least one external device, a driving unit, a camera, a memory, a display, and a processor. The memory may store instructions that, when executed, cause the processor to obtain an image of an object through the camera, identify a type of the object, based on the image of the object, obtain customer data including movement information of the object and a head direction of the object through the camera based on the type of the object, determine a movement of the electronic device based on the customer data, and control the driving unit to move the electronic device depending on the determined movement of the electronic device.

20 Claims, 14 Drawing Sheets

(51) Int. Cl.
*G05B 19/418* (2006.01)
*G05D 1/00* (2006.01)
*G06Q 30/0601* (2023.01)
*G06V 20/10* (2022.01)
*G06V 40/16* (2022.01)
*G06V 40/20* (2022.01)

(52) U.S. Cl.
CPC ....... *G05D 1/0246* (2013.01); *G06Q 30/0623* (2013.01); *G06Q 30/0639* (2013.01); *G06V 20/10* (2022.01); *G06V 40/172* (2022.01); *G06V 40/20* (2022.01); *G05B 2219/31001* (2013.01); *G05B 2219/50391* (2013.01)

(58) Field of Classification Search
CPC ........... G05B 2219/40202; G05B 2219/40411; G05D 1/0212; G05D 1/0231; G05D 2201/0211; G05D 1/0246; G06Q 30/0623; G06Q 30/0639; G06Q 30/0207–30/0277; G06V 20/10; G06V 40/172; G06V 40/20; G06V 20/52; B25J 9/1697; B25J 11/008; B25J 9/161; B25J 9/163
See application file for complete search history.

(56) References Cited

U.S. PATENT DOCUMENTS

| | | | |
|---|---|---|---|
| 9,796,093 B2 | 10/2017 | Mascorro Medina et al. | |
| 10,551,839 B2 | 2/2020 | Jeong et al. | |
| 11,400,599 B2* | 8/2022 | Kim | B25J 15/08 |
| 11,565,425 B2* | 1/2023 | Fox | B25J 5/007 |
| 2011/0128223 A1* | 6/2011 | Lashina | G06F 3/012 |
| | | | 345/158 |
| 2013/0085345 A1* | 4/2013 | Geisner | G06Q 30/00 |
| | | | 600/300 |
| 2014/0067679 A1* | 3/2014 | O'Reilly | G06Q 20/40145 |
| | | | 705/44 |
| 2014/0229518 A1* | 8/2014 | Wang | G06F 3/1454 |
| | | | 709/201 |
| 2017/0116589 A1* | 4/2017 | Krishnaiah | G06Q 20/322 |
| 2017/0337602 A1* | 11/2017 | Davis | G06V 40/174 |
| 2018/0043542 A1* | 2/2018 | Mascorro Medina | |
| | | | B25J 11/008 |
| 2018/0068177 A1* | 3/2018 | Sakai | G06Q 30/0617 |
| 2018/0068321 A1* | 3/2018 | Maeda | B25J 11/0005 |
| 2018/0150882 A1* | 5/2018 | Hu | G06Q 30/0269 |
| 2018/0157898 A1* | 6/2018 | Tsuneno | G06V 20/53 |
| 2019/0200510 A1* | 7/2019 | Chrysanthakopoulos | |
| | | | B60K 17/28 |
| 2019/0279233 A1* | 9/2019 | Friedl | G06Q 30/0261 |
| 2019/0385267 A1 | 12/2019 | Shin | |
| 2020/0027460 A1* | 1/2020 | Seo | G10L 15/1815 |
| 2020/0078937 A1* | 3/2020 | Sun | G05B 19/41875 |
| 2020/0218254 A1* | 7/2020 | Sohn | G05D 1/0088 |
| 2020/0320297 A1* | 10/2020 | Ahn | G06V 40/10 |
| 2020/0411154 A1* | 12/2020 | Lee | G06V 10/764 |
| 2021/0101290 A1* | 4/2021 | Kim | G06V 20/20 |
| 2021/0117652 A1* | 4/2021 | Mossoba | G06V 40/172 |
| 2021/0233110 A1* | 7/2021 | Ye | G06Q 30/0255 |
| 2021/0373576 A1* | 12/2021 | Sohn | B25J 9/1697 |
| 2022/0324646 A1* | 10/2022 | Sohn | B25J 9/0084 |

FOREIGN PATENT DOCUMENTS

| | | | |
|---|---|---|---|
| KR | 10-2011-0103537 A | | 9/2011 |
| KR | 2018-0047664 A | * | 4/2018 |
| KR | 10-2018-0055140 A | | 5/2018 |
| KR | 10-2019-0106921 A | | 9/2019 |
| KR | 10-2019-0119551 A | | 10/2019 |
| KR | 2019-0128230 A | * | 10/2019 |
| KR | 2021-0045022 A | * | 10/2019 |
| KR | 10-2019-0139183 A | | 12/2019 |
| KR | 10-2063150 B1 | | 1/2020 |

OTHER PUBLICATIONS

Request for the Submission of an Opinion dated Dec. 19, 2023, in connection with Korean Application No. 10-2023-0164269, 9 pages.

* cited by examiner

METHOD FOR DETERMINING MOVEMENT OF ELECTRONIC DEVICE AND ELECTRONIC DEVICE USING SAME

CROSS-REFERENCE TO RELATED APPLICATION

This application is based on and claims priority under 35 U.S.C. § 119 to Korean Patent Application No. 10-2019-0179037, filed on Dec. 31, 2019, in the Korean Intellectual Property Office, the disclosure of which is incorporated by reference herein its entirety.

BACKGROUND

1. Field

The disclosure relates to a method for determining movement of an electronic device and an electronic device using the same.

2. Description of Related Art

In the past, research and development (R&D) on robots has been focused on factory automation. However, interest has recently shifted, especially to service robots, as well as personal and home service robots, and R&D on professional service robots for serving customers in commercial stores is being conducted.

Service robots may be divided into personal service robots and professional service robots. The personal service robot may provide a service for supporting seniors such as walking assistance and living assistance for seniors, that are capable of servicing individuals, an education services such as tutors and educational equipment, and a housekeeping support service such as cleaning and tidying. The professional service robot refers to a robot used for extreme work or public service that is incapable of being conducted by a person. There are public service robots such as guides and helpers, extreme working robots such as firefighting and lifesaving, and military robots.

However, unlike other professional service robots, in the case of professional service robots in commercial stores, it may be difficult to exactly determine whether a plurality of objects are customers and to respond to different needs of each customer while the professional service robots walk around a store.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and device that may recognize an object approached by an electronic device, may determine movement based on customer data including a head direction of the object, and may move the electronic device using a driving unit.

An aspect of the disclosure is to provide a method and device that may recognize a target product using the location of an object and provides a service for the target product.

In accordance with an aspect of the disclosure, an electronic device may include a communication circuit receiving data from at least one external device or to transmit data to the at least one external device, a driving unit, a camera, a memory, a display, and a processor. The memory may store instructions that, when executed, cause the processor to obtain an image of an object through the camera, to identify a type of the object, based on the image of the object, to obtain customer data including movement information of the object and a head direction of the object through the camera based on the type of the object, to determine a movement of the electronic device based on the customer data, and to control the driving unit to move the electronic device depending on the determined movement of the electronic device.

In accordance with another aspect of the disclosure, a method performed by an electronic device may include obtaining an image of an object through a camera included in the electronic device when a process for a memory included in the electronic device or connected to the electronic device is executed, identifying a type of the object, based on the image of the object, obtaining customer data including movement information of the object and a head direction of the object through the camera based on the type of the object, determining a movement of the electronic device based on the customer data, and controlling a driving unit included in the electronic device to move the electronic device depending on the determined movement of the electronic device.

Other aspects, advantages, and salient features of the disclosure will become apparent to those skilled in the art from the following detailed description, which, taken in conjunction with the annexed drawings, discloses various embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

FIGS. 1 through 14, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, various embodiments of the disclosure may be described with reference to accompanying drawings. Accordingly, those of ordinary skill in the art will recognize that modification, equivalent, and/or alternative on the various embodiments described herein may be variously made without departing from the scope and spirit of the disclosure.

Figure 1:
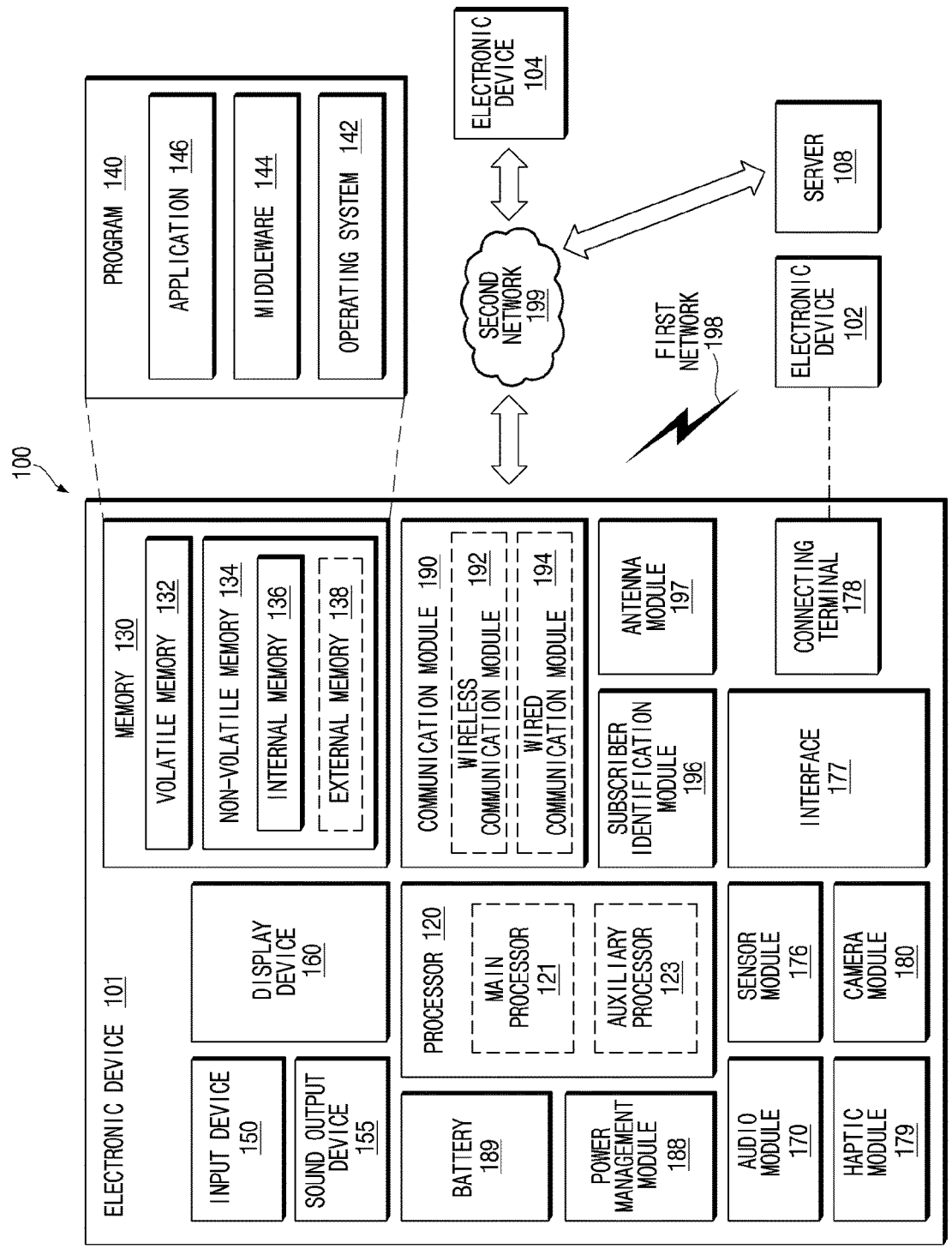
FIG. 1 illustrates a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
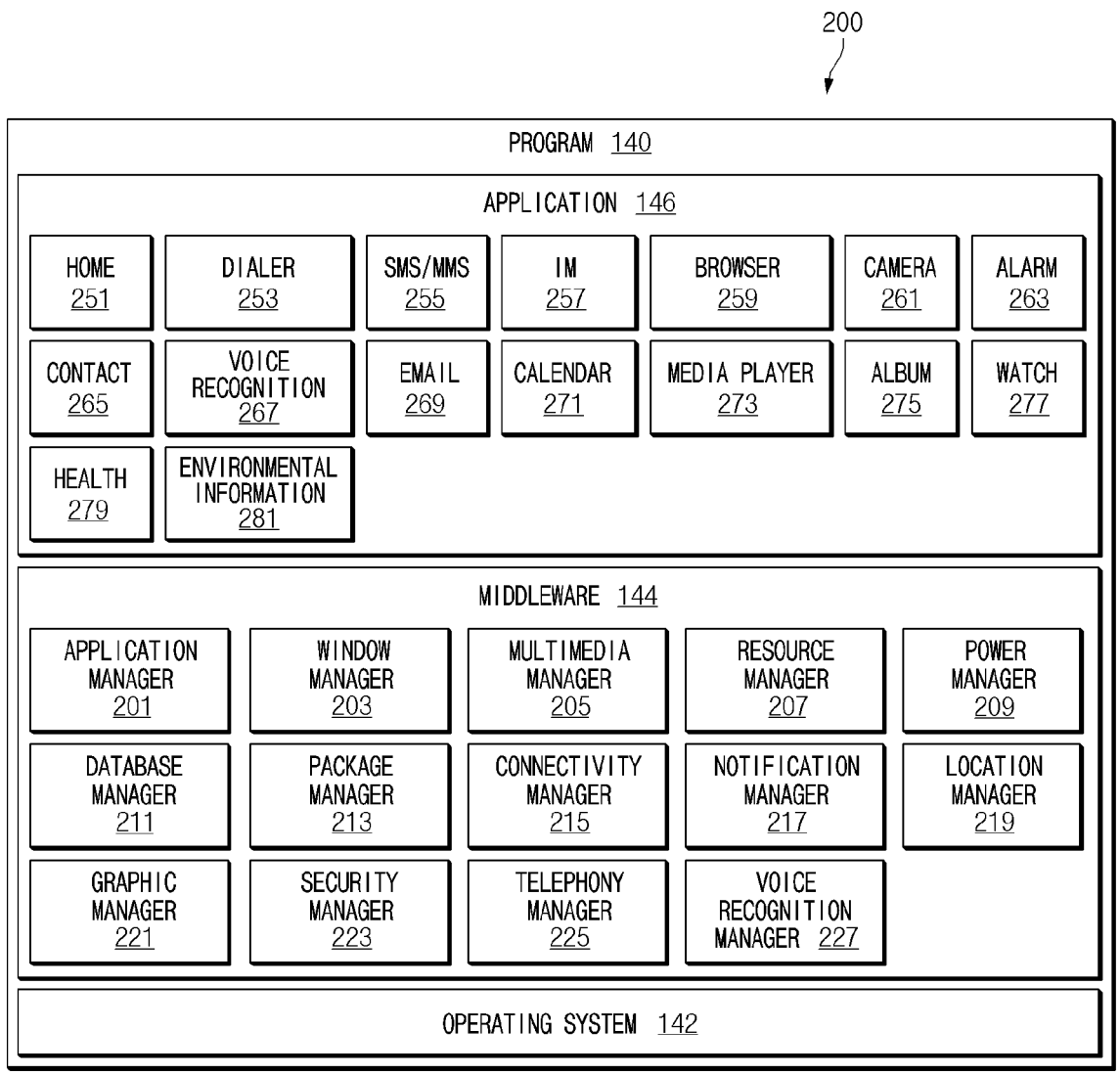
FIG. 2 illustrates a block diagram illustrating the program according to various embodiments.

FIG. 2 is a block diagram 200 illustrating the program 140 according to various embodiments. According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227.

The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130. The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects.

The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101.

The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

Figure 3:
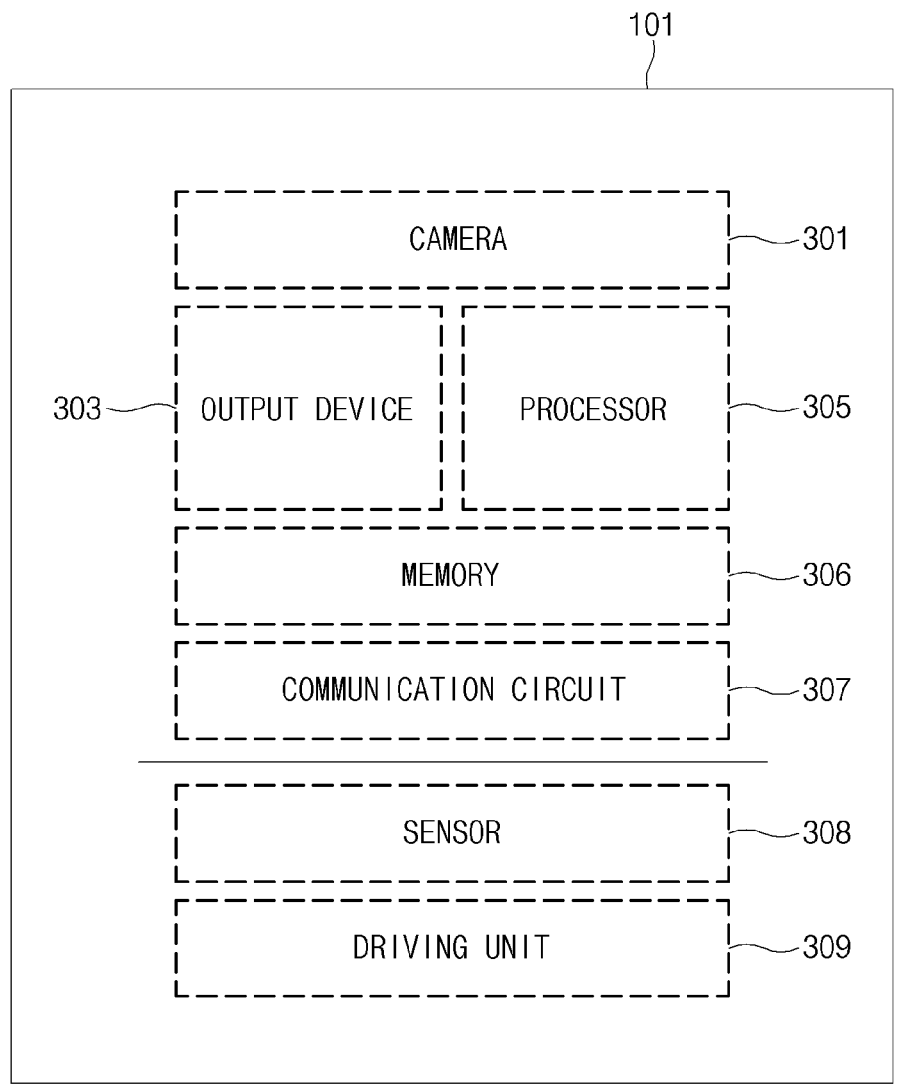
FIG. 3 illustrates a block diagram of an electronic apparatus according to an embodiment.

FIG. 3 illustrates a block diagram illustrating a structure of the electronic device 101 according to an embodiment.

According to an embodiment, the electronic device 101 may include a processor 305 (e.g., the processor 120 of FIG. 1), a memory 306 (e.g., the memory 130 of FIG. 1), a sensor 308 (e.g., the sensor module 176 of FIG. 1), a communication circuit 307 (e.g., the communication module 190 of FIG. 1), an output device 303 (e.g., the display device 160 and the sound output device 155 of FIG. 1), a camera 301, and a driving unit 309. However, FIG. 3 describes one exemplary embodiment, and some components may be omitted or changed.

The memory 306 may be an internal storage medium embedded in the electronic device 101. For example, the internal storage medium may include a nonvolatile memory. The memory may include an external storage medium (not illustrated) installed outside the electronic device 101. For example, the external storage medium may include a nonvolatile memory. The external storage medium may be removable; according to an embodiment, the external storage medium may not be mounted on the electronic device 101.

The memory 306 may store instructions that cause the processor 305 to process data or to control the electronic device 101. In this specification, it may be understood that the operation of the processor 305 or the electronic device 101 is performed as the processor 305 executes instructions stored in the memory 306.

For example, the processor 305 obtains an image of an object through the camera 301, and identifies the type of the object based on the image of the object. The type of the object may include the type of a customer and the type of an employee. The camera may include a 3D depth camera. In the 3D depth camera, in addition to capturing a live focus image, augmented reality (AR)-based automatic measurement of a distance, line, area, and volume may be possible.

The processor 305 may obtain customer data including movement information of the object and the head direction of the object, through the camera 301 based on the type of the object. For example, the processor may obtain customer data stored in the memory 306. Alternatively, the processor may obtain the customer data stored in an external device, using the communication circuit 307. For example, the customer data may include information of at least one of the location, approach distance, direction, and speed of the object.

The processor 305 may store instructions that make it possible to determine the movement of the electronic device 101 based on the customer data and to move the electronic device depending on the determined movement of the electronic device, using the driving unit 309. The processor 305 may be implemented with a separate module or chip in the electronic device 101.

The communication circuit 307 may exchange commands or data with an external device (not illustrated) or another electronic device, using GPS, Bluetooth, BLE, Wi-Fi, NFC, and the like. Alternatively, the current location may be measured based on the received or detected wireless signal. The communication circuit 307 may perform wired/wireless communication with one external device, or simultaneously perform wired/wireless communication with a plurality of external devices.

The sensor 308 may include an infrared sensor, a motion sensor, and the like, and may measure the movement of an object. The motion sensor may include an accelerometer, a gyroscope, a barometer, a geomagnetic sensor, and the like and may measure the movement of the object. The sensor may sense the approach of the object by grasping the location, approach distance, direction, and speed of the object. The sensor 308 may deliver the sensed value to the processor 305. The processor 305 may obtain customer data and information about an approaching object, based on the received value. The sensor 308 may be composed depending on the type of information to be obtained.

The driving unit 309 may move the electronic device 101 depending on the movement determined by the processor. The driving unit 309 may include any form that allows the electronic device 101 to move. For example, the driving unit 309 may include at least one of at least one wheel, a caterpillar, or a plurality of legs.

According to an embodiment, the processor 305 may process signals measured from the sensor 308 of the electronic device 101 and may display the processed signals through the output device 303. The electronic device 101 may also provide the feedback of sound and/or vibration through the output device 303. Alternatively, other devices may be controlled through the communication circuit 307; alternatively, data may be stored through the communication circuit 307. The processor 305 may be composed of at least one processor, and may be driven while being physically divided into a main processor performing high-performance processing and an auxiliary processor performing low-power processing. At this time, the sensor 308 may be connected to the auxiliary processor to perform 24-hour monitoring. Alternatively, one processor may switch between high performance and low power depending on situations.

Hereinafter, the operation of the processor 305 will be described in detail.

In an embodiment, the processor 305 may store instructions that make it possible to obtain the image of the object through the camera of the electronic device, to identify the type of the object based on the image of the object, to obtain customer data including movement information of the object and a head direction of the object through the camera based on the type of the object, to determine the movement of the electronic device based on the customer data, and to move the electronic device depending on the determined movement of the electronic device using the driving unit of the electronic device. In this case, the customer data may further include at least a piece of information among the location, approach distance, direction, and speed of the object.

In an embodiment, the processor 305 determines the similarity between the image of the obtained object and the image of an employee stored in a memory; when it is determined based on the similarity that the image of the object is not the image of the employee, the processor 305 may determine that the type of the object is a customer.

In an embodiment, when it is determined that the type of the object is a customer, the processor 305 may store the obtained image in the memory and may delete the obtained image from the memory when a threshold time elapses.

In an embodiment, the processor 305 may determine a target product of the object, using the head direction and angle of the object, and may display data for the target product.

In an embodiment, the customer data may include at least a piece of data of the height of an object, the location of the object from a reference point, and the direction of the object; the processor 305 may determine the target product, using the head angle and at least a piece of data of the height of an object, the location of the object from a reference point, and the direction of the object, which are included in the customer data.

In an embodiment, when the object enters within a critical (or a threshold) distance, the processor 305 may allow the electronic device to move; when the number of objects recognized through the camera increases, the processor 305 may decrease the critical distance.

In an embodiment, when the number of objects recognized through the camera is not less than a critical (or a threshold) value, the processor 305 may make a request for the support of other electronic devices, using the communication circuit.

In an embodiment, when the image of the recognized object is the image of a customer, the processor 305 may determine whether the image of the recognized object is an image of a customer served again; when the image of the recognized object is not the image of the customer served again, the processor 305 may execute the first mode; when the image of the recognized object is the image of the customer served again, the processor 305 may execute the second mode.

In an embodiment, the processor 305 may detect a state change of at least one object located within the critical distance, may re-determine the movement of the electronic device in response to the detected state change, and may move the electronic device depending on the re-determined movement using the driving unit.

Figure 4:
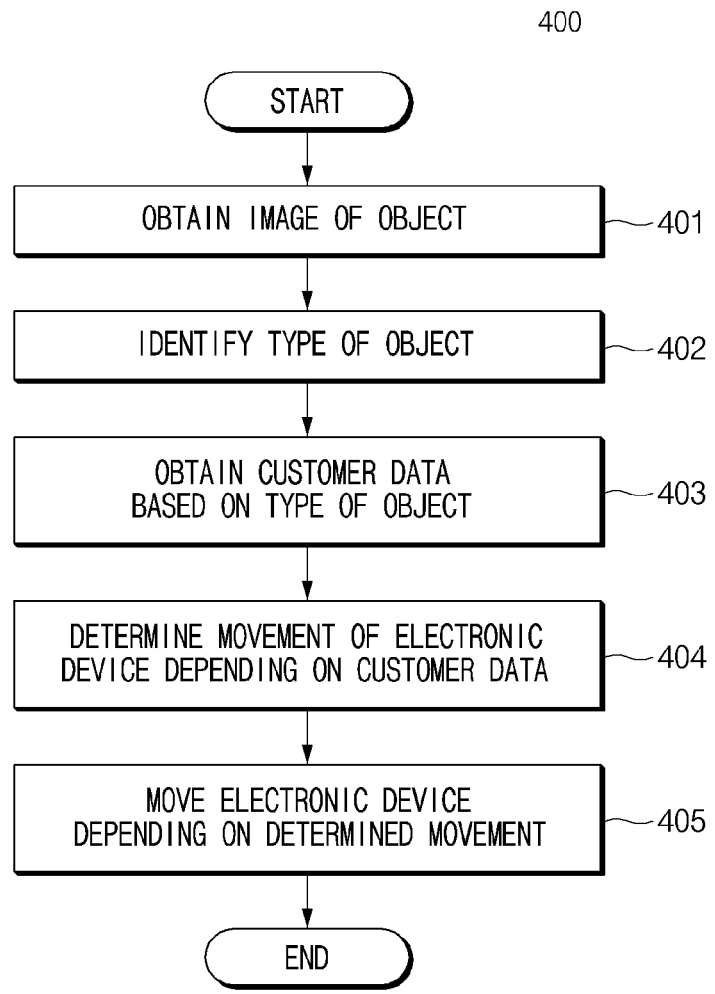
FIG. 4 illustrates a flowchart of a method for determining movement of an electronic device according to an embodiment.

FIG. 4 illustrates a flowchart 400 of a method for determining movement of an electronic device according to an embodiment of the disclosure. According to an embodiment, it may be understood that the process illustrated in FIG. 4 is performed by the processor (e.g., the processor 120 of FIG. 1) of an electronic device (e.g., the electronic device 101 of FIG. 1) by executing instructions stored in a memory (e.g., the memory 130 of FIG. 1).

In operation 401, the electronic device may obtain an image of an object. The object is a person who approaches an electronic device. The electronic device may obtain the image of the object through a camera. For example, when an object approaches a range within a critical distance, the electronic device may obtain the image of the object by recognizing the face of the object through the camera. This will be described in detail with respect to FIG. 5.

In operation 402, the electronic device may identify the type of the object. The type of the object refers to the type to which the image of the object belongs. For example, the type of the object may include customers and employees.

In an embodiment, the electronic device may compare the image of the object with the stored image of an employee to determine the type of the object. This will be described in detail with reference to FIG. 7.

In operation 403, the electronic device may obtain customer data based on the type of the object. For example, the electronic device determines whether the object type is a customer; when the type of the object is a customer, the electronic device may obtain customer data. The customer data refers to data for the object including movement information of the object and the head direction of the object. For example, the customer data may further include at least a piece of information among the location, approach distance, direction, and speed of the object in addition to the head direction.

In an embodiment, the electronic device may obtain the customer data including movement information of the object and the head direction of the object, using a sensor and a camera.

In operation 404, the electronic device may determine the movement of the electronic device based on the customer data. The movement of the electronic device may include a movement in which the electronic device moves the electronic device using a driving unit, as well as a movement in which the electronic device remains at a standstill without movement.

In an embodiment, the electronic device may determine the output content of the electronic device based on the customer data as well as movement.

This will be described in detail with reference to FIGS. 7 to 12.

In operation 405, the electronic device may move the electronic device depending on the determined movement. For example, the electronic device may move the electronic device depending on the determined movement of the electronic device, using the driving unit of the electronic device. At this time, the electronic device may output the determined output content, using an output device. For example, the electronic device may allow the electronic device to utter the output content using a speaker. Alternatively, an electronic device may display the output content, using a display.

According to an embodiment, the process illustrated in FIG. 4 may be performed using a server. For example, in operation 401, an image of the object may be obtained through the camera of the electronic device; when the obtained image is transmitted to a server, operation 402 to operation 404 may be performed by the server; in operation 405, the server may transmit data for the determined movement to the electronic device, and the electronic device may move the electronic device depending on the determined movement, using the driving unit.

Figure 5:
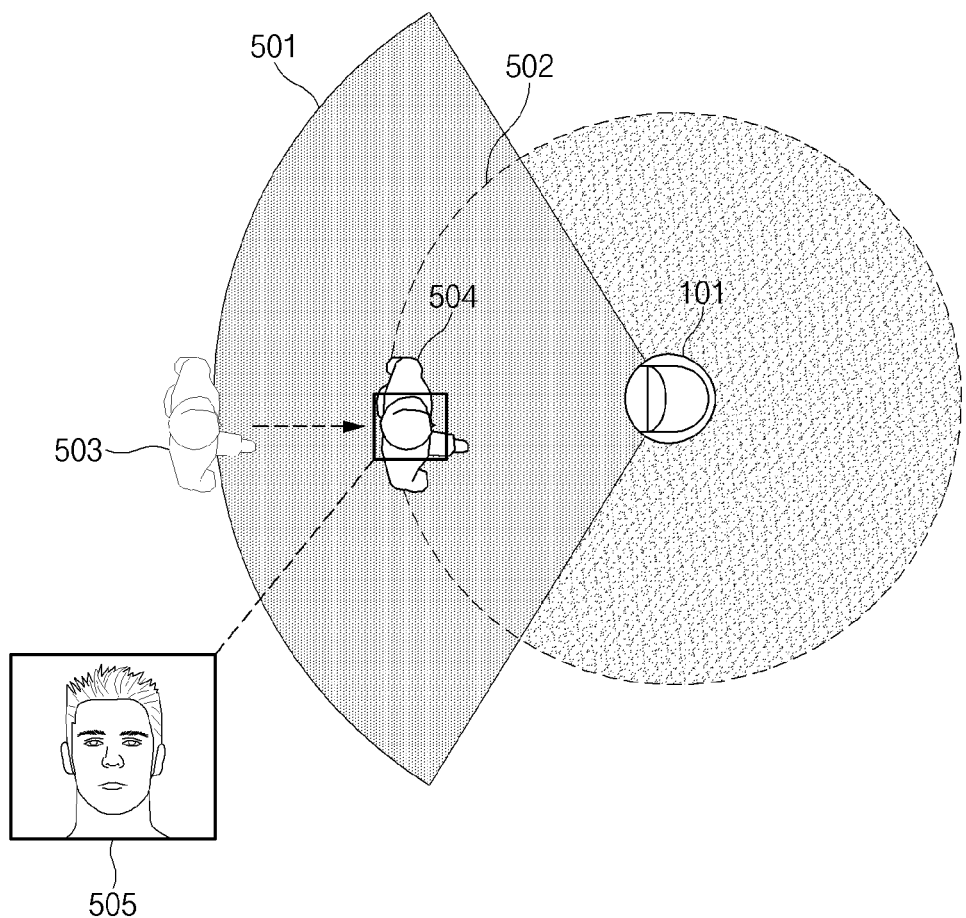
FIG. 5 illustrates an exemplary diagram of a method in which an electronic device recognizes an image of an object.

FIG. 5 illustrates an exemplary diagram of a method in which an electronic device recognizes an image of an object.

When it is recognized using a camera or sensor that an object is within a recognition distance 501, the electronic device 101 may obtain an image 505 of an object, using the camera.

The recognition distance 501 refers to a distance within which an object is capable of being recognized through the sensor or camera of the electronic device 101. The recognition distance may be determined depending on the performance of the electronic device, or may be determined by settings.

When the image 505 of the recognized object is the image of the customer, and it is detected that the object approaches (504) a critical distance 502 using a sensor or camera, the electronic device 101 may move the electronic device, using a driving unit.

The critical distance 502 refers to a maximum distance between an electronic device and an object capable of moving the electronic device 101. Like the recognition distance, a critical distance may be determined depending on the performance of the electronic device, or may be determined by settings.

In an embodiment, when the number of objects recognized through the camera increases, the electronic device 101 may reduce the critical distance. For example, when the number of objects recognized within the recognition distance 501 through the camera increases, the electronic device 101 may target objects in order, in which the critical distance 502 is approached by reducing the critical distance 502, and may determine the movement of only the targeted object.

In an embodiment, when the number of objects recognized through the camera is not less than the critical value, the electronic device may make a request for the support of other electronic devices using a communication circuit included in the electronic device. For example, when the number of objects recognized within the recognition distance 501 is not less than the critical value, the electronic device 101 may make a request for the support of other electronic devices, using the communication circuit, and thus a plurality of electronic devices may determine the movements of a plurality of objects.

Figure 6:
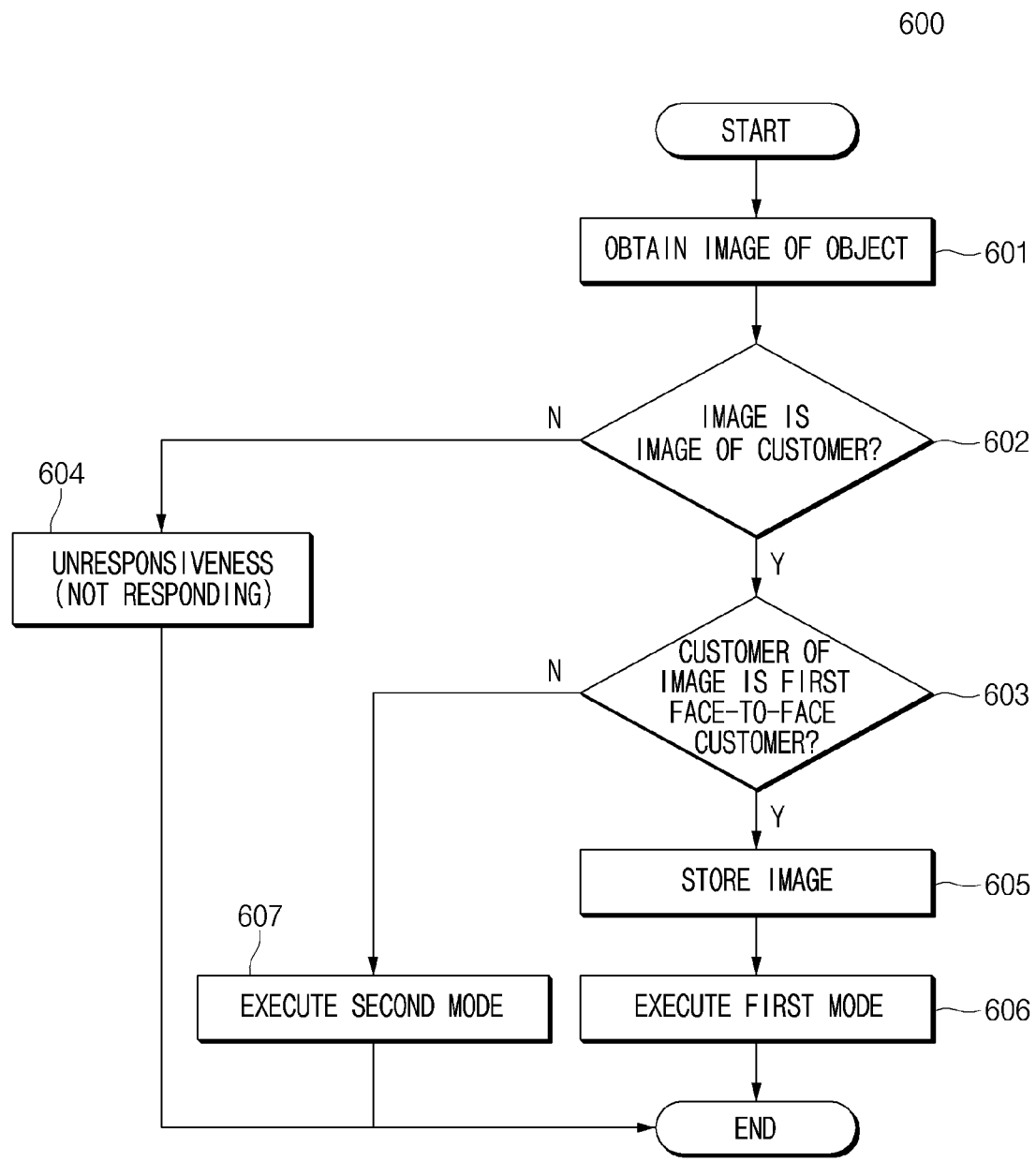
FIG. 6 illustrates a flowchart of another method for determining movement of an electronic device according to an embodiment.

FIG. 6 illustrates a flow chart 600 of another method for determining a movement of an electronic device according to one embodiment. According to an embodiment, it may be understood that the process illustrated in FIG. 6 is performed by the processor (e.g., the processor 120 of FIG. 1) of an electronic device (e.g., the electronic device 101 of FIG. 1) by executing instructions stored in a memory (e.g., the memory 130 of FIG. 1).

In operation 601, the electronic device may obtain an image of an object. As described above in detail, some components may be omitted or changed.

In operation 602, the electronic device determines whether the obtained image is an image of a customer. The image of the customer may mean that the image of the object is not an image of an employee. When the image of the object is not the image of the customer, in operation 604, the electronic device may be unresponsive. In contrast, in the case of a customer image, operation 603 may be performed. For example, the electronic device may determine the similarity between the stored employee's image and the object image obtained in operation 601; when the similarity is not greater than a critical value, the electronic device may determine that the type of the object is a customer, and may determine that the image of the object is the image of the customer.

When it is determined that the image obtained in operation 602 is the image of the customer, in operation 603, the electronic device may determine whether the customer of the image is the first face-to-face customer. For example, the electronic device may determine whether the customer is the first face-to-face customer, by comparing the similarity between the obtained image and the image stored as a customer in the electronic device. For example, when the result of comparing the similarity between the obtained image and the stored image by the electronic device in operation 603 indicates that all the similarities are not greater than the critical value, the electronic device may determine that the customer is the first face-to-face customer. When it is determined in operation 603 that the customer is the first face-to-face customer, in operation 605, the electronic device may store the obtained image as the image of the customer in the memory. When a critical (or a threshold) time has elapsed from a point in time when the image is stored, the electronic device may delete the stored image from the memory depending on settings.

In operation 606, the electronic device may execute a first mode. The first mode may include various modes for responding to the first face-to-face customer. This will be described in detail with reference to FIGS. 7 to 12.

On the other hand, in operation 603, when the electronic device determines that the obtained image is not the image of the first face-to-face customer, in operation 607, the electronic device may execute a second mode. For example, the electronic device may compare the similarity between the stored image of the customer and the obtained image; when there is an image having the similarity that is not less than the critical value, the electronic device may determine that the customer is not the first face-to-face customer, and the electronic device may execute the second mode. The second mode refers to the mode according to the manual for dealing with customers, not the first face-to-face customer. For example, in the second mode, the electronic device does not respond. The electronic device responds differently depending on whether a customer is the first face-to-face customer, and thus it is possible to improve the intimacy with the customer.

According to an embodiment, the process illustrated in FIG. 6 may be performed using a server as in FIG. 4. For example, in operation 601, an image of the object may be obtained through the camera of the electronic device; when the obtained image is transmitted to a server, operation 602 to operation 605 may be performed by the server; in operation 606 or operation 607, when the server transmits, to the electronic device, data as to whether a customer is the first face-to-face customer, the electronic device may execute the first mode (operation 606) or the second mode (operation 607).

In FIGS. 7 to 12, various example diagrams, in each of which an electronic device moves depending on the determined movement, are illustrated.

Figure 7:
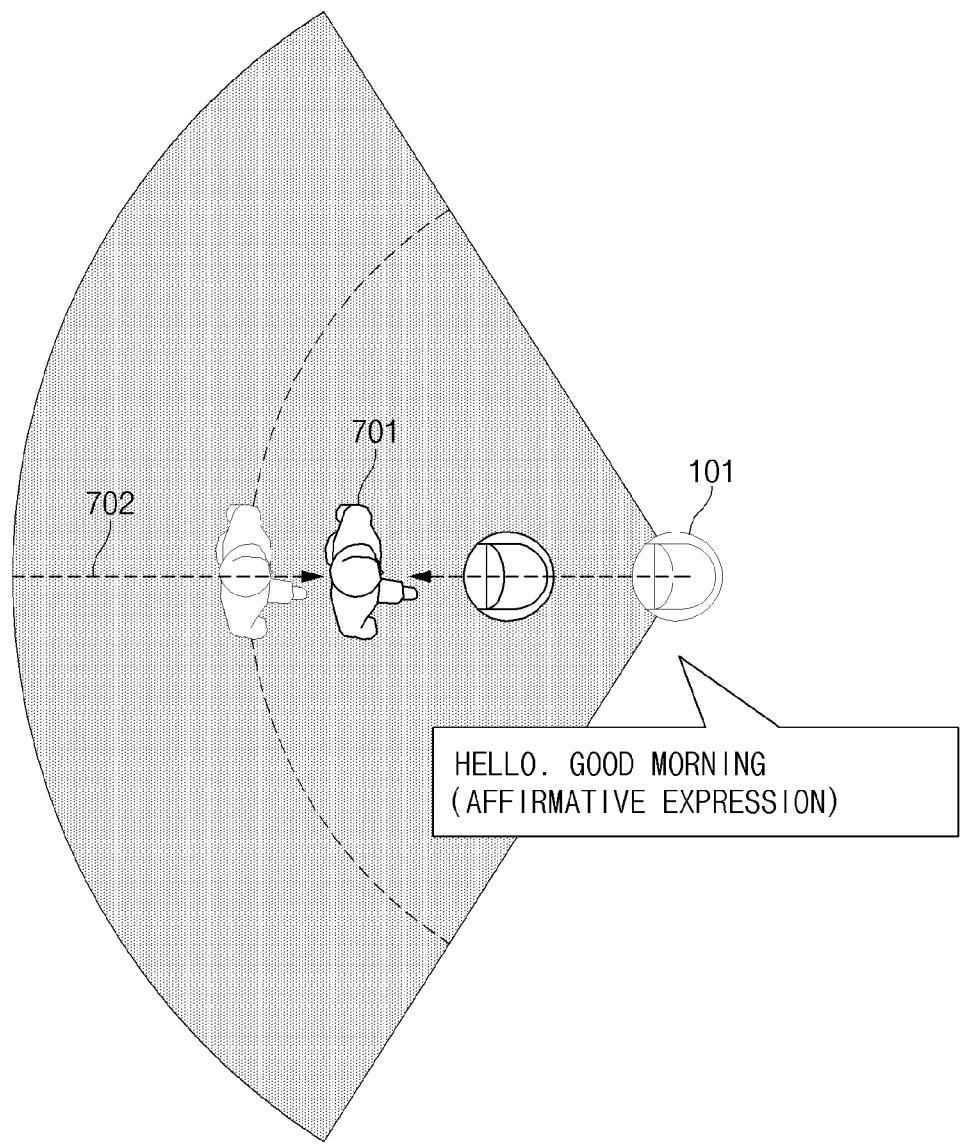
FIG. 7 illustrates an exemplary view of a method in which an electronic device moves depending on the determined movement.

FIG. 7 illustrates a movement in which the electronic device 101 makes approaches in a straight line to be matched with the speed of an object 701. An object 701, illustrated in FIG. 7, approaches in a direction 702 of the electronic device 101. Also, the head direction of an object is facing the electronic device 101. This may mean that the object 701 recognizes the electronic device 101 and is interested in the electronic device 101.

The electronic device 101 may recognize the movement of the illustrated object and may determine the movement. The electronic device 101 may determine the movement that 1) the head direction is the direction facing the object, 2) the electronic device 101 displays a light (e.g., green) indicating that the object makes an approach, and 3) the electronic device 101 moves in a straight line toward the object 701 up to a specified distance (e.g., 1 m) of the object 701. When the object 701 enters within the critical distance, the electronic device 101 may move using a driving unit depending on the determined movement. At this time, the electronic device 101 may utter content (e.g., "Hello. Good morning.") including affirmative expression, using a speaker. The affirmative expression may include any expression for inducing a positive response to the object 701.

Figure 8:
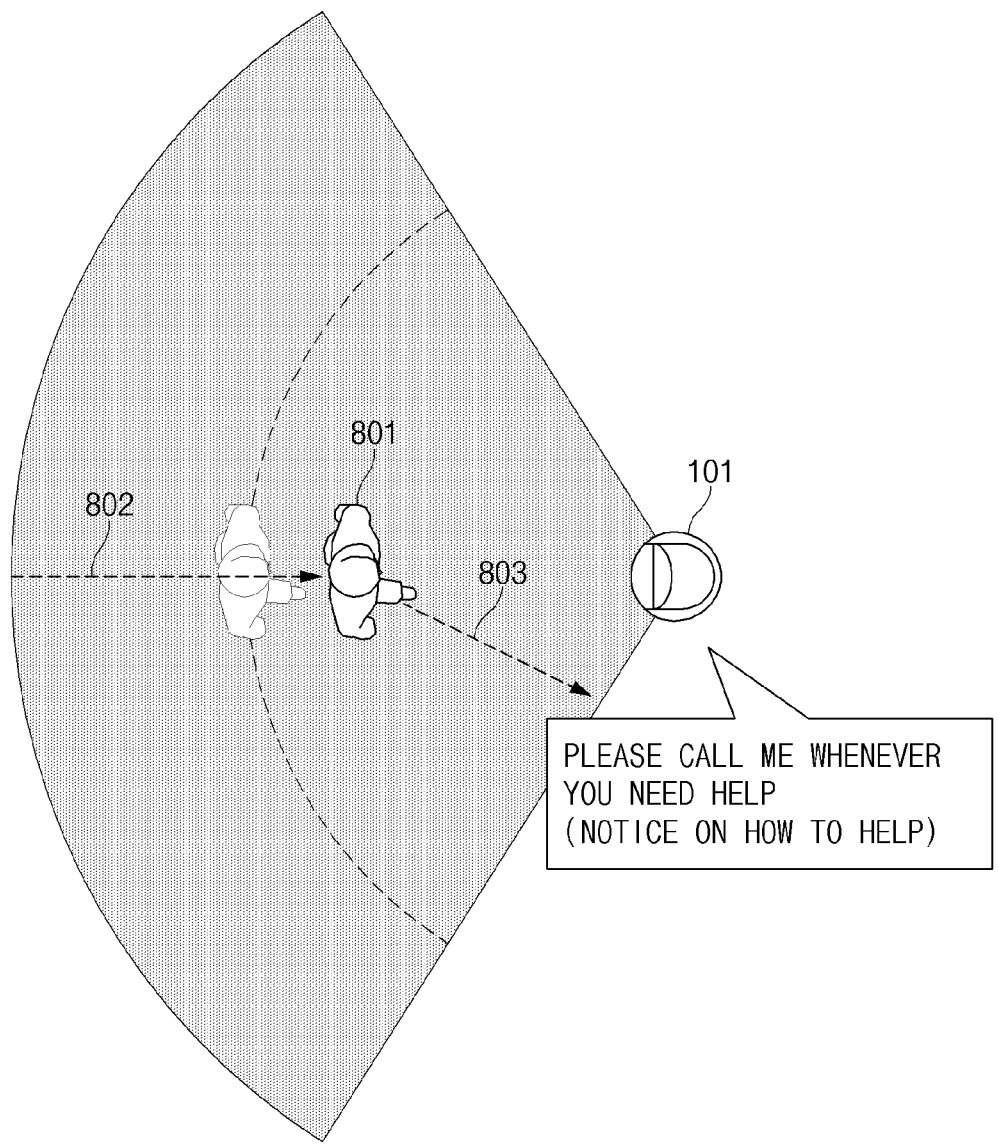
FIG. 8 illustrates another exemplary view of a method in which an electronic device moves depending on the determined movement.

FIG. 8 illustrates a movement in which the electronic device 101 faces an object but does not make approaches. An object 801 illustrated in FIG. 8 makes approaches in a direction 802 of the electronic device 101, but a head direction 803 of the object does not face the electronic device 101. This may mean that the object 801 does not recognize the electronic device 101, but the target product of the object is located in the direction of the electronic device.

The electronic device 101 may recognize the movement of the illustrated object and may determine the movement of the electronic device. For example, the electronic device 101 may determine the movement that 1) the head direction is the direction for tracking the movement of the object, 2) the electronic device 101 displays a light (e.g., yellow) indicating a wait, and/or 3) a body is stopped at a standstill while the direction of the body maintaining the front. When the object 801 enters within the critical distance, the electronic device 101 may stop at a standstill depending on the determined movement and may control a head, a light indicator, or the like. At this time, the electronic device 101 may utter content providing a notification of how to help (e.g., "Please call me whenever you need help"), using a speaker.

Figure 9:
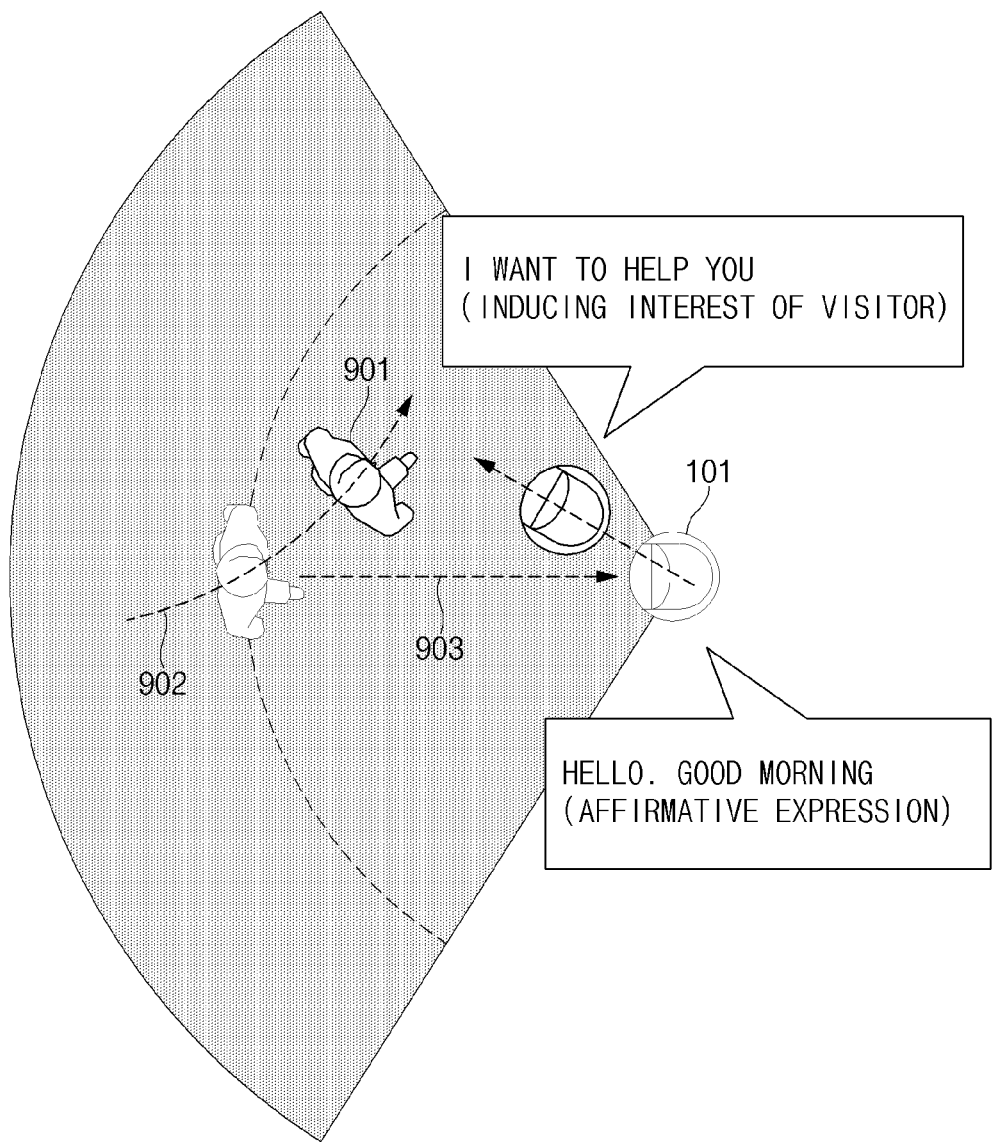
FIG. 9 illustrates another exemplary view of a method in which an electronic device moves depending on the determined movement.

FIG. 9 illustrates a movement in which the electronic device 101 moves along a moving line of an object by a certain distance. An object 901 illustrated in FIG. 9 makes approaches in the direction 902 passing by the electronic device 101, but a head direction 903 faces the electronic device 101. This may mean that the object 901 is interested in the electronic device 101, but the target product of the object 901 is located in a direction different from the direction of the electronic device.

The electronic device 101 may recognize the movement of the illustrated object and may determine the movement of the electronic device. For example, the electronic device 101 may determine the movement such that 1) the head direction is the direction for tracking the movement of the object, 2) the electronic device 101 displays a light (e.g., green) indicating an approach, and 3) the electronic device 101 moves along the moving line of the object up to a specified distance (e.g., 1 m) of the object. When the object 901 enters within a critical distance, the electronic device 101 may move along the moving line of the object up to a specified distance (e.g., 1 m) of the object, using a driving unit. The electronic device 101 may utter content (e.g., "Hello. Good morning.") including affirmative expression, and content (e.g., I want to help you.) for inducing the interest of the object, using a speaker.

Figure 10:
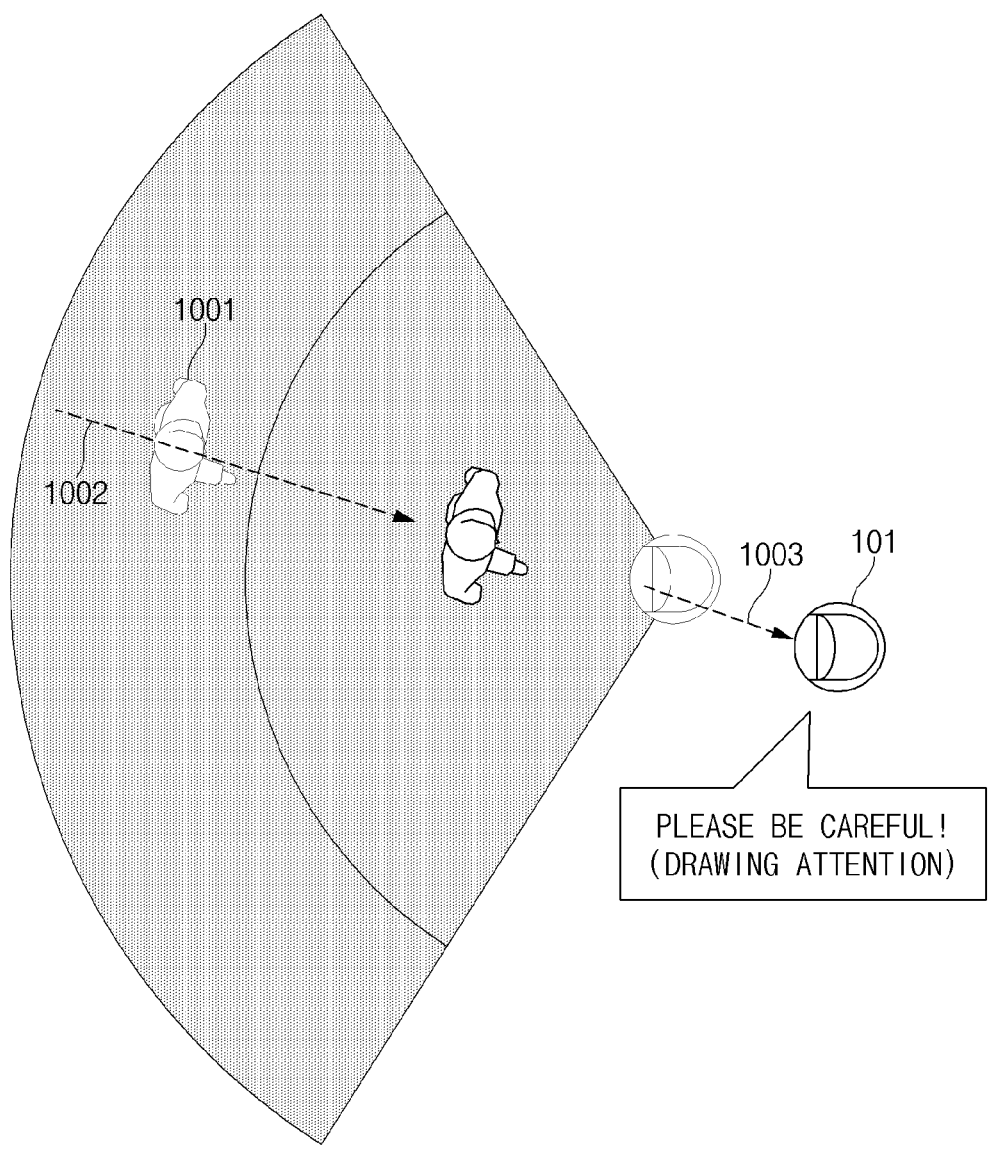
FIG. 10 illustrates yet another exemplary view of a method in which an electronic device moves depending on the determined movement.

FIG. 10 illustrates a movement in which the electronic device 101 steps back for a while and then slowly keeps a distance from an object. An object 1001 illustrated in FIG. 10 makes approaches in a direction 1002 of the electronic device 101 at high speed. In this case, there is a risk of collision. This may mean that the object 1001 does not recognize the existence of the electronic device.

The electronic device 101 may recognize the movement of the illustrated object and may determine the movement of the electronic device. For example, the electronic device 101 may determine the movement such that 1) the head direction faces the front, 2) the electronic device 101 displays a light (e.g., red) indicating danger, and 3) the electronic device 101 moves in an direction 1003 opposite to the direction in which the object makes an approach. When the object 1001 enters within a critical distance, the electronic device 101 may move depending on the determined movement in the direction 1003 opposite to the direction in which the object makes an approach, using a driving unit. At this time, the electronic device 101 may utter content (e.g., "Please be careful!") for drawing attention, using a speaker.

Figure 11:
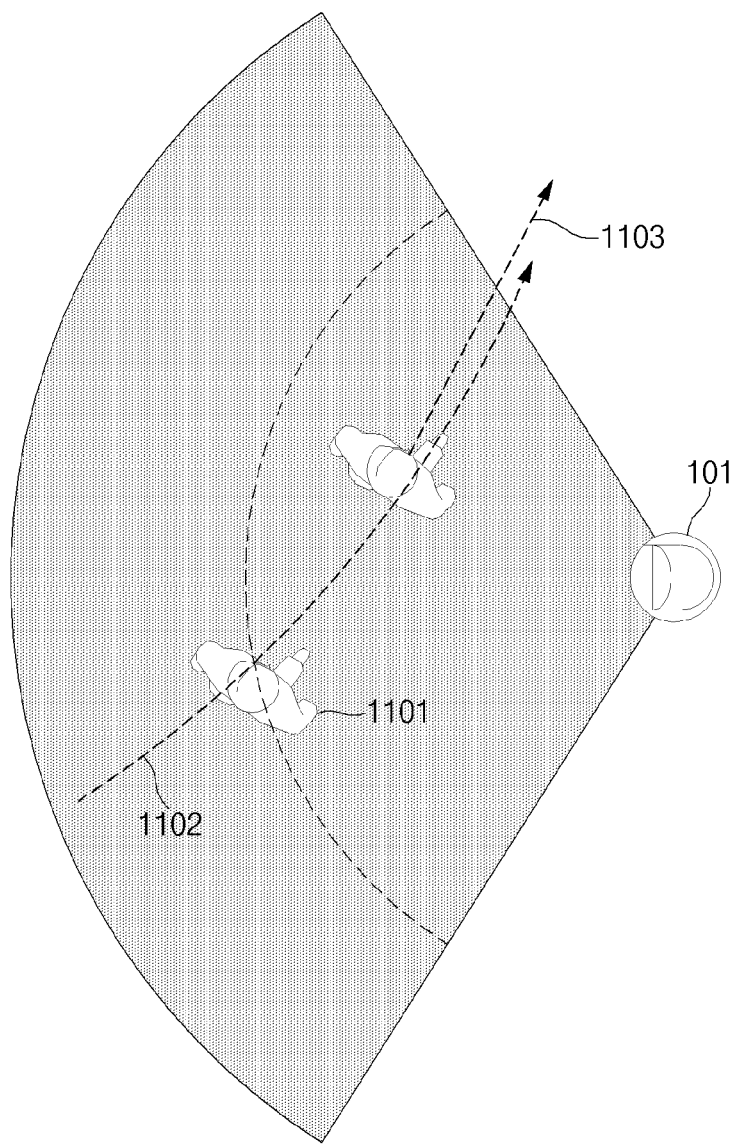
FIG. 11 illustrates yet another exemplary view of a method in which an electronic device moves depending on the determined movement.

FIG. 11 illustrates a movement in which the electronic device 101 waits at a standstill. A head direction of an object 1101 illustrated in FIG. 11 is a direction 1103 that does not face the electronic device 101 and the object 1101 is moving in a direction passing by the electronic device 101. This may mean that the object 1101 is not interested in the electronic device 101, and the target product of the object 1101 is also located in a direction different from the direction of the electronic device.

The electronic device 101 may recognize the movement of the illustrated object and may determine the movement of the electronic device. For example, the electronic device 101 may determine the movement such that 1) the head direction faces the front, 2) the electronic device 101 displays a light (e.g., yellow) indicating a wait, and 3) the electronic device 101 waits at a standstill. At this time, the electronic device 101 may not utter separate content through a speaker.

Figure 12:
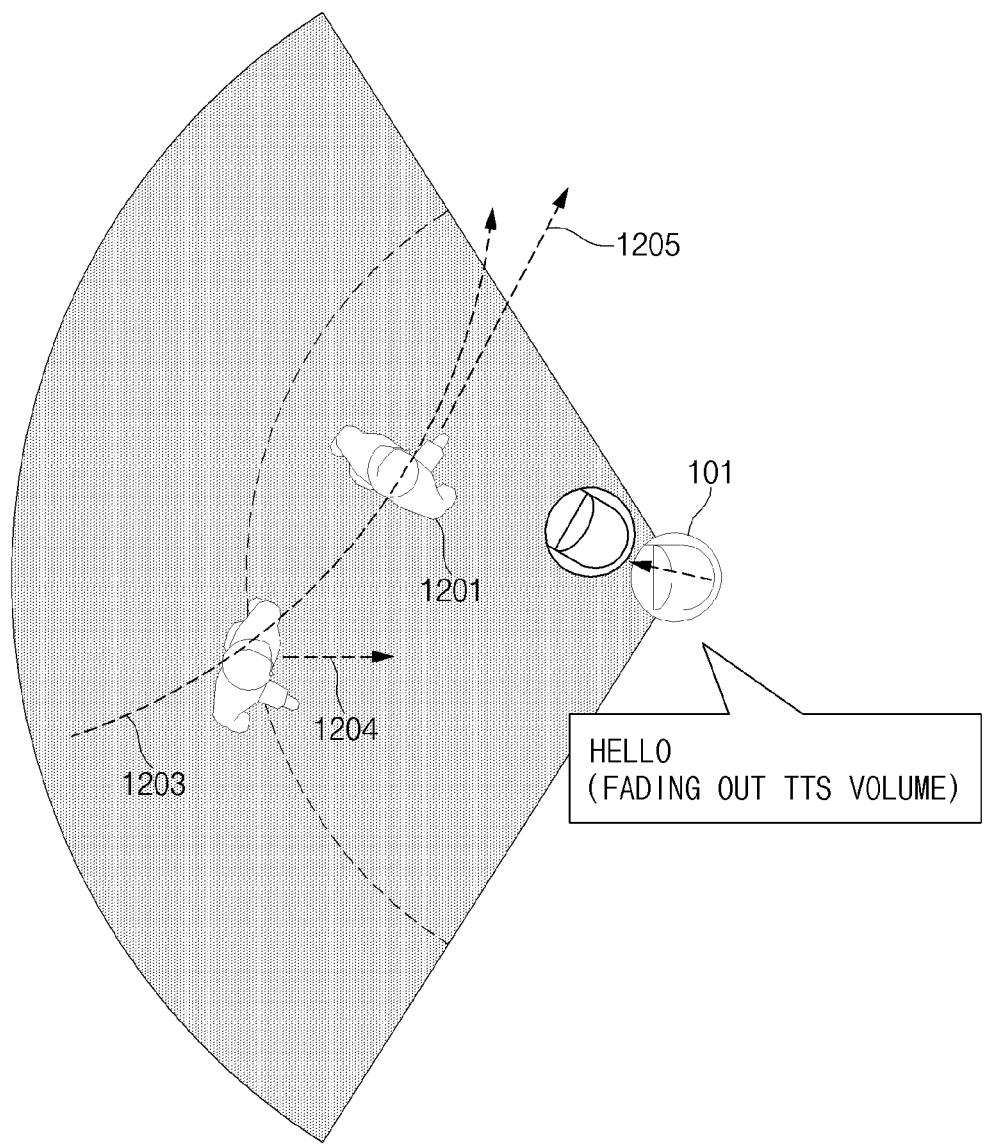
FIG. 12 illustrates yet another exemplary view of a method in which an electronic device moves depending on the determined movement.

FIG. 12 illustrates a movement in which the electronic device 101 moves toward an object and then returns to an original location. An object 1201 illustrated in FIG. 12 first makes an approach a head direction 1204 toward the electronic device 101 and then changes to a head direction 1205, which does not face an electronic device, on the way. In addition, the object 1201 appears to be approaching the electronic device 101 and then moves to a path 1203 passing by the electronic device. This may mean that the object 1201 is interested in the electronic device 101, but the target product of the object 1201 is located in a direction different from the direction of the electronic device. Alternatively, this may mean that the target product of object 1201 is changed on the way.

The electronic device 101 may recognize the movement of the illustrated object and may determine the movement of the electronic device. For example, the electronic device 101 may track the movement of the object 1201 depending on the head direction, may display a light (e.g., green) indicating an approach, and may move toward the object 1201. At this time, the electronic device 101 may utter content (e.g., "Hello.") indicating affirmative expression, using a speaker. When the head direction of the object 1201 is changed from the direction towards the electronic device 101 to the direction 1205 that does not face the electronic device 101, the electronic device 101 may stop and display a light (e.g., yellow) indicating a wait while tracking the movement of the object 1201 depending on the head direction. At this time, the volume of a speaker may also fade out. When the object 1201 completely deviates from the recognition distance of the electronic device 101, the electronic device 101, which has been in a standby state, may return to the first location, using a driving unit.

Figure 13:
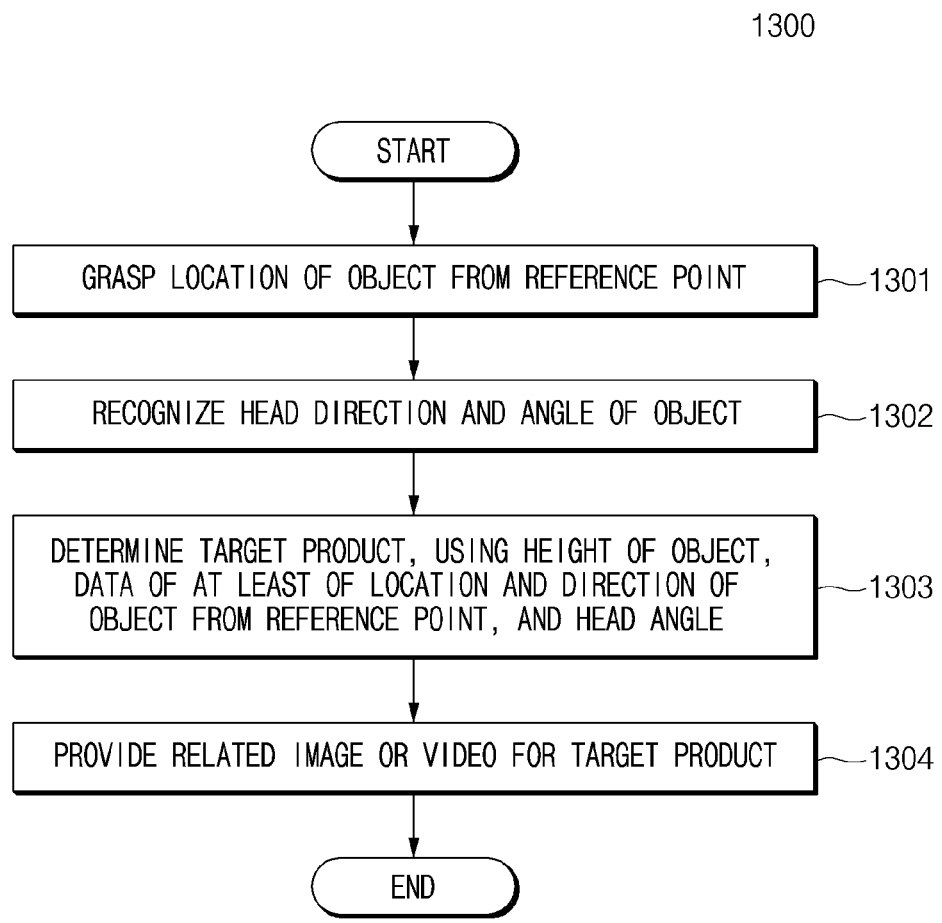
FIG. 13 illustrates a flowchart of a method in which an electronic device provides a service for a target product, according to an embodiment.

FIG. 13 illustrates a flowchart 1300 of a method in which an electronic device provides a service for a target product, according to an embodiment. According to an embodiment, it may be understood that the process illustrated in FIG. 13 is performed by the processor (e.g., the processor 120 of FIG. 1) of an electronic device (e.g., the electronic device 101 of FIG. 1) by executing instructions stored in a memory (e.g., the memory 130 of FIG. 1).

In operation 1301, the electronic device 101 may grasp the location of an object from a reference point. The reference point refers to a point that is a reference for grasping the location of an object. For example, the reference point may be a specified location in a space shared by the object and the electronic device, and may be the current location of the electronic device. At this time, the head direction of the electronic device 101 may face the object, and the electronic device 101 may display a light (e.g., yellow) indicating a wait and may remain in place.

In operation 1302, the electronic device 101 may recognize the head direction and angle of the object. For example, the electronic device 101 may obtain an image of an object using a camera and may analyze the image to recognize the head direction and angle of the object. For example, the electronic device 101 may determine whether the head direction and angle of the recognized object stay within a specific range during a specific period. When the head direction and angle of the recognized object stay within a specific range during a specific period, the head direction of the electronic device 101 may face a customer, and the electronic device 101 may stop after moving by a specific distance from the object, using a driving unit.

In operation 1303, the electronic device 101 may determine the target product, using the height of the object, data of at least of the location and direction of the object from the reference point, and a head angle. The target product means a product that the object is interested in.

In operation 1304, the electronic device 101 may provide a related image or video for the target product. The related image or video for the target product may refer to content including the description of the target product. For example, the content may include advertising content for a target product, review content for the target product, a website for the target product, or the like.

For example, the electronic device 101 may display advertisement content or review images of the target product, using a display unit. At this time, the electronic device may utter content including information about the target product, using a speaker.

According to an embodiment, the process illustrated in FIG. 13 may also be performed using a server. For example, the electronic device may perform operation 1301 and operation 1302 through a camera or sensor included in the electronic device, and may transmit information about the obtained object to the server. The server may perform operation 1303 and may transmit data regarding the target product to the electronic device. The electronic device may perform operation 1304 using an output device included in the electronic device.

Figure 14:
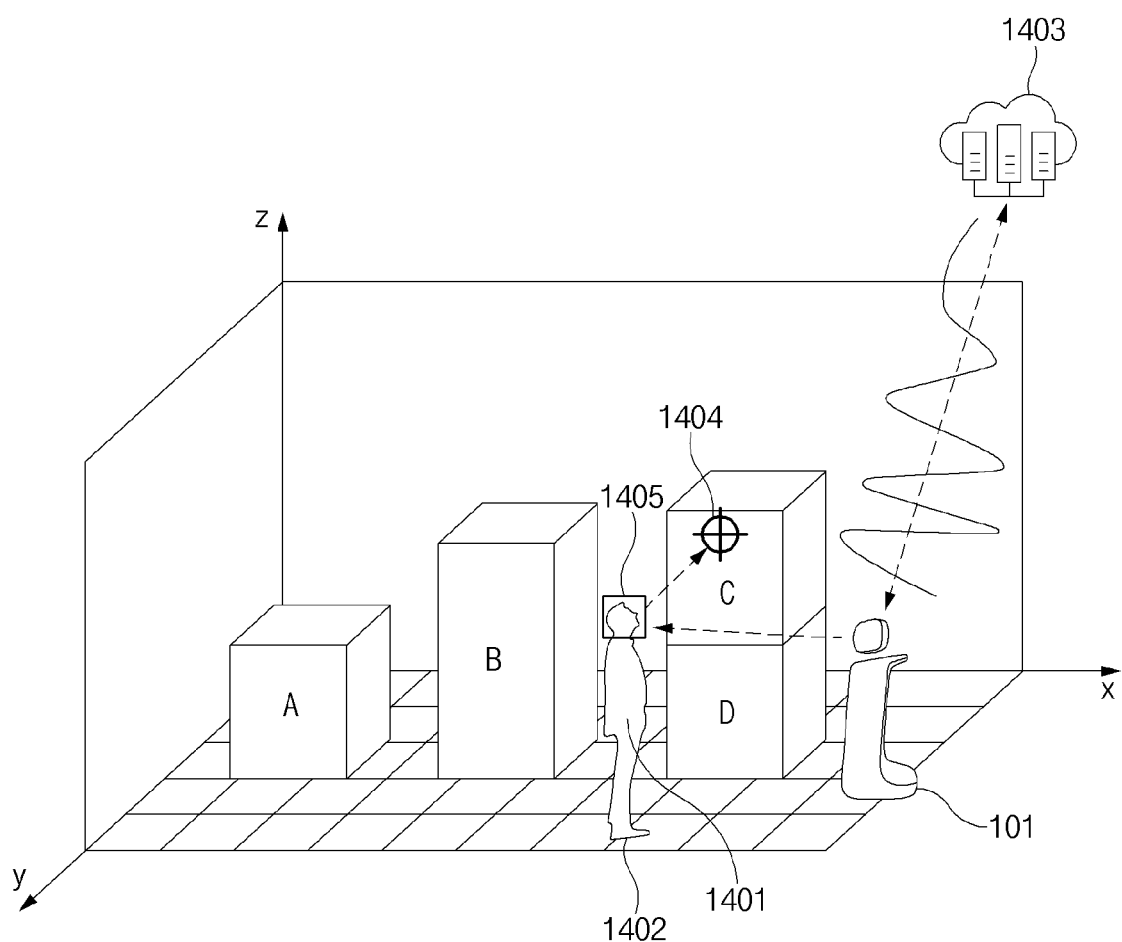
FIG. 14 illustrates a conceptual diagram for a method in which an electronic device determines a target product.

FIG. 14 illustrates a conceptual diagram for additional descriptions of a method in which an electronic device determines a target product.

The memory of the electronic device 101 or a server 1403 may store entire information of a space where the electronic device is located and location information about a product displayed in the space as Map data. As illustrated in FIG. 14, Map data may divide the entire space at specific intervals, and may display areas A, B, C, and D of each product. The electronic device 101 may determine the target product using the Map data.

The electronic device 101 may grasp a location 1402 of the object 1401 by comparing the values of x-axis and y-axis with a current location of the electronic device 101 as a reference point. Alternatively, the electronic device 101 may grasp the location 1402 of the object 1401, using a unique 'x' value and a unique 'y' value for a specified location in a space shared by the object 1401 and the electronic device 101.

The electronic device 101 may calculate the head angle of the object 1401 and the head direction of the object 1401 based on the height of the object 1401 and may determine a gaze 1405 of the object 1401 based on the head angle of the object 1401 and the head direction of the object 1401. The electronic device 101 may determine a target point 1404 depending on the determined gaze 1405 of the object 1401. The electronic device 101 may determine the target product, using product location information exhibited at the target point 1404. At this time, the electronic device 101 may store the target product in a customer interest product database.

The electronic device 101 may receive content for the determined target product from the server 1403. The electronic device 101 may display the received content. At this time, the electronic device 101 may move to the location 1402 of the object by a specified distance (e.g., 1 m), using a driving unit, and then may display the content for the target product.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimal unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

According to embodiments disclosed in the specification, it is possible to provide a method and device that may induce intimate interaction, such as a person-to-person relationship, by determining a movement mode of approaching an object depending on the movement of the object, based on customer data including the head direction of the object approached by an electronic device.

According to embodiments disclosed in the specification, it is possible to provide a method and device that may determine a target product matched with a customer's need based on the customer data including the head direction of the object approached by the electronic device, and may provide a service for the target product.

Besides, a variety of effects directly or indirectly understood through the disclosure may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. A service robot comprising:
   a driving unit configured to move the service robot;
   a camera;
   memory; and
   a processor,
   wherein the memory stores instructions that, when executed by the processor, cause the service robot to:
   obtain first information for a first object through the camera;
   determine a first similarity based on the obtained first information and second information stored in the memory, wherein the second information is associated with a first type of object;
   if the first similarity is less than a first reference similarity, determine a second similarity based on the obtained first information and third information stored in the memory, wherein the third information is associated with a second type of object;
   if the second similarity is greater than a second reference similarity, execute a first function of the service robot corresponding to a first mode; and
   if the second similarity is less than the second reference similarity, execute a second function of the service robot corresponding to a second mode.

2. The service robot of claim 1,
   wherein the instructions that, when executed by the processor, cause the service robot to:
   if the first similarity is less than the first reference similarity, identify a head direction of the first object and an approach direction of the first object; and
   in response to identifying the head direction of the first object toward the service robot and the approach direction of the first object toward the service robot, control the driving unit to move the service robot toward the first object;
   while the service robot moves toward the first object, track the approach direction of the first object and the head direction of the first object; and
   if the head direction of the first object toward the service robot or the approach direction of the first object toward the service robot is not identified through the tracking, control the driving unit to move the service robot toward a designated location.

3. The service robot of claim 1, wherein the instructions that, when executed by the processor, cause the service robot to:
   if the second similarity is less than the second reference similarity, store the first information as a part of the third information.

4. The service robot of claim 1, wherein the instructions that, when executed by the processor, cause the service robot to: delete the third information from the memory in response to a threshold time elapsing.

5. The service robot of claim 2, wherein the instructions that, when executed by the processor, cause the service robot to:
determine a target product based on the head direction and fourth information stored in the memory, wherein the fourth information is associated with products placed in a space where the service robot is positioned; and
display content associated with the target product.

6. The service robot of claim 2, wherein the instructions that, when executed by the processor, cause the service robot to: if the first similarity is greater than the first reference similarity, control the driving unit to wait at a standstill.

7. The service robot of claim 2, wherein the instructions that, when executed by the processor, cause the service robot to:
if the head direction of the first object toward the service robot is not identified and the approach direction of the first object toward the service robot is identified through the tracking, control the driving unit to wait at a standstill.

8. The service robot of claim 2, wherein the instructions that, when executed by the processor, cause the service robot to:
if the head direction of the first object toward the service robot is identified and the approach direction of the first object toward the service robot is not identified through the tracking, control the driving unit to move the service robot toward the first object.

9. The service robot of claim 2, wherein the instructions that, when executed by the processor, cause the service robot to:
if the head direction of the first object toward the service robot is not identified and the approach direction of the first object toward the service robot is not identified through the tracking, control the driving unit to wait at a standstill.

10. The service robot of claim 2, wherein the instructions that, when executed by the processor, cause the service robot to:
identify a speed of the first object; and
maintain a designated distance from the first object based on the speed of the first object.

11. The service robot of claim 1, wherein the instructions that, when executed by the processor, cause the service robot to:
in response to a determination that a distance between the service robot and the first object is corresponded to a first reference distance, control the driving unit to move the service robot toward the first object.

12. The service robot of claim 11, wherein the instructions that, when executed by the processor, cause the service robot to:
in response to identifying a pre-specified number of other objects from the first information:
adjust the first reference distance to a second reference distance; and
in response to a determination that the distance between the service robot and the first object is corresponded to the second reference distance, control the driving unit to move the service robot toward the first object.

13. The service robot of claim 11, wherein the instructions that, when executed by the processor, cause the service robot to:
control the driving unit to move the service robot toward the first object until the distance between the service robot and the first object is corresponded to a third reference distance.

14. A method performed by a service robot, the method comprising:
obtaining first information for a first object through a camera included in the service robot;
determining a first similarity based on the obtained first information and second information stored in the service robot, wherein the second information is associated with a first type of object;
determining that the first similarity is less than a first reference similarity, determining a second similarity based on the obtained first information and third information stored in a memory, wherein the third information is associated with a second type of object;
determining the second similarity is less than a second reference similarity; and
executing a function of the service robot corresponding to
controlling a driving unit included in the service robot to move the service robot toward the first object,
wherein determining the first similarity is less than the first reference similarity comprises identifying a head direction of the first object and an approach direction of the first object.

15. The method of claim 14, further comprising:
while the service robot moves toward the first object, tracking the approach direction of the first object and the head direction of the first object; and
controlling the driving unit to move the service robot toward a designated location, based on determining that the head direction of the first object toward the service robot is not identified through the tracking or the approach direction of the first object toward the service robot is not identified through the tracking.

16. The method of claim 15, further comprising:
controlling the driving unit to wait at a standstill, based on determining that the head direction of the first object toward the service robot is not identified and the approach direction of the first object toward the service robot is identified through tracking the approach direction of the object and the head direction of the object.

17. The method of claim 15, further comprising:
controlling the driving unit to move the service robot toward the first object, based on determining that the head direction of the first object toward the service robot is identified and the approach direction of the first object toward the service robot is not identified through tracking the approach direction of the object and the head direction of the object.

18. The method of claim 15, further comprising:
controlling the driving unit to wait at a standstill, based on determining that the head direction of the first object toward the service robot is not identified and the approach direction of the object toward the service robot is not identified through tracking the approach direction of the first object and the head direction of the object.

19. The method of claim 14, further comprising:
storing the first information as a part of the third information, based on determining that the second similarity is less than the second reference similarity.

20. The method of claim 19, further comprising:
deleting the third information from the memory based on a threshold time elapsing.

* * * * *